United States Patent [19]

Chen et al.

[11] Patent Number: 4,529,577

[45] Date of Patent: Jul. 16, 1985

[54] OXYGEN/NITROGEN PRODUCTION WITH MOLTEN ALKALI SALTS

[75] Inventors: Michael S. Chen, Zionsville; Michael T. Heffelfinger, Allentown, both of Pa.

[73] Assignee: Air Products and Chemicals, Inc., Allentown, Pa.

[21] Appl. No.: 629,652

[22] Filed: Jul. 11, 1984

[51] Int. Cl.³ .................. C01B 21/04; C01B 13/02; B01D 53/34

[52] U.S. Cl. ................. 423/351; 423/210.5; 423/219; 423/579

[58] Field of Search ............ 423/210.5, 219, 351, 423/579

[56] References Cited

U.S. PATENT DOCUMENTS

| | | |
|---|---|---|
| 4,132,766 | 1/1979 | Erickson .................. 423/579 |
| 4,287,170 | 9/1981 | Erickson .................. 423/579 |
| 4,340,578 | 7/1982 | Erickson .................. 423/579 |

*Primary Examiner*—Earl C. Thomas
*Attorney, Agent, or Firm*—Geoffrey L. Chase; James C. Simmons; E. Eugene Innis

[57] ABSTRACT

Method of separating oxygen or nitrogen from air using as an oxygen acceptor composition a molten solution of alkali metal salt of a cation composition of sodium and potassium cations and an anion composition of 50 to 94% nitrate, 4 to 25% nitrite and combined oxide, peroxide and superoxide wherein said oxides are present in less than 1 mol % based on sodium peroxide.

6 Claims, 4 Drawing Figures

OXYGEN/NITROGEN PRODUCTION WITH MOLTEN ALKALI SALTS

TECHNICAL FIELD

The present invention is directed to an improvement in the production of oxygen or nitrogen from air utilizing molten alkali metal salts as oxygen acceptors in a reversible, continuous chemical separation or air into oxygen and nitrogen products. More particularly, the present invention is directed to a process using an alkali metal salt composition with a reduced oxide content which provides lower corrosion rates, lower nitrogen oxide by-products and acceptable oxygen uptake.

BACKGROUND OF THE PRIOR ART

Various methods are known for the separation of air into its constituent predominant gas compositions, namely; oxygen and nitrogen. In U.S. Pat. No. 4,132,766 a process is set forth wherein air is separated into an oxygen product and a nitrogen-rich waste stream utilizing an oxygen acceptor composition comprising the alkali metal nitrate and nitrite salts which will reversibly absorb oxygen differentially over nitrogen from air. It is noted in that patent that the nitrates will decompose into the superoxides and that nitrogen and oxygen will form resulting nitrogen oxides during the absorption process.

In U.S. Pat. No. 4,287,170, a process is set forth for the chemical separation of air into both oxygen and nitrogen wherein the nitrogen is further purified of any trace oxygen by passage through an oxygen scavenger such as manganese oxide. The process discloses that the nitrate to nitrite ratio is between 5 and 20 and the molten salt additionally has at least 1% total dissolved oxides such as peroxides and superoxides.

Finally in U.S. Pat. No. 4,340,578 another chemical air separation process is set forth wherein the molten salt oxygen acceptor comprises a cation composition of sodium and potassium cations and an anion composition of 50 to 94% nitrate, 4 to 25% nitrite and 2 to 25% combined peroxide and superoxide. The patent specifically desired that the oxide concentration is above 2% in order to effectively catalyze the oxygen uptake of the absorber or acceptor, reduce the nitrogen oxide levels and avoid highly corrosive conditions. It is preferred to operate near the 2% minimum concentration set forth in the patent.

The present invention overcomes the drawbacks of nitrogen oxide formation, inactivity of the oxygen acceptor and corrosiveness of the salt composition with an improved composition which effectively provides good separation of oxygen from air.

BRIEF SUMMARY OF THE INVENTION

The present invention is directed to a continuous process for recovering oxygen or nitrogen from air comprising reacting an oxygen acceptor with air in an absorption reaction to produce a nitrogen-rich effluent, separately decomposing the oxidized acceptor to yield oxygen and regenerated oxygen acceptor and recycling the oxygen acceptor, said oxygen acceptor comprising a molten solution of alkali metal salt of cation composition of sodium and potassium cations and an anion composition of 50 to 94% nitrate, 4 to 25% nitrite and combined peroxide, oxide and superoxide, the improvement wherein said oxides are present in less than 1 mol% based on sodium peroxide.

Preferably, the reaction temperature of the oxygen separation from air is conducted in the range of 850° to 1250° F.

The oxides in the molten solution of alkali metal salt may be generated in situ by a high temperature pretreatment of the solution or they may be added as oxides directly to the molten solution of alkali metal salts.

Optimally, the reaction temperature for the oxygen separation from air is conducted at approximately 1200° F.

It is preferred that the oxide concentration in the molten solution of alkali metal salt be approximately 0.1 mole % in order to reduce the corrosiveness of the molten solution.

DETAILED DESCRIPTION OF THE INVENTION

Figure 1:
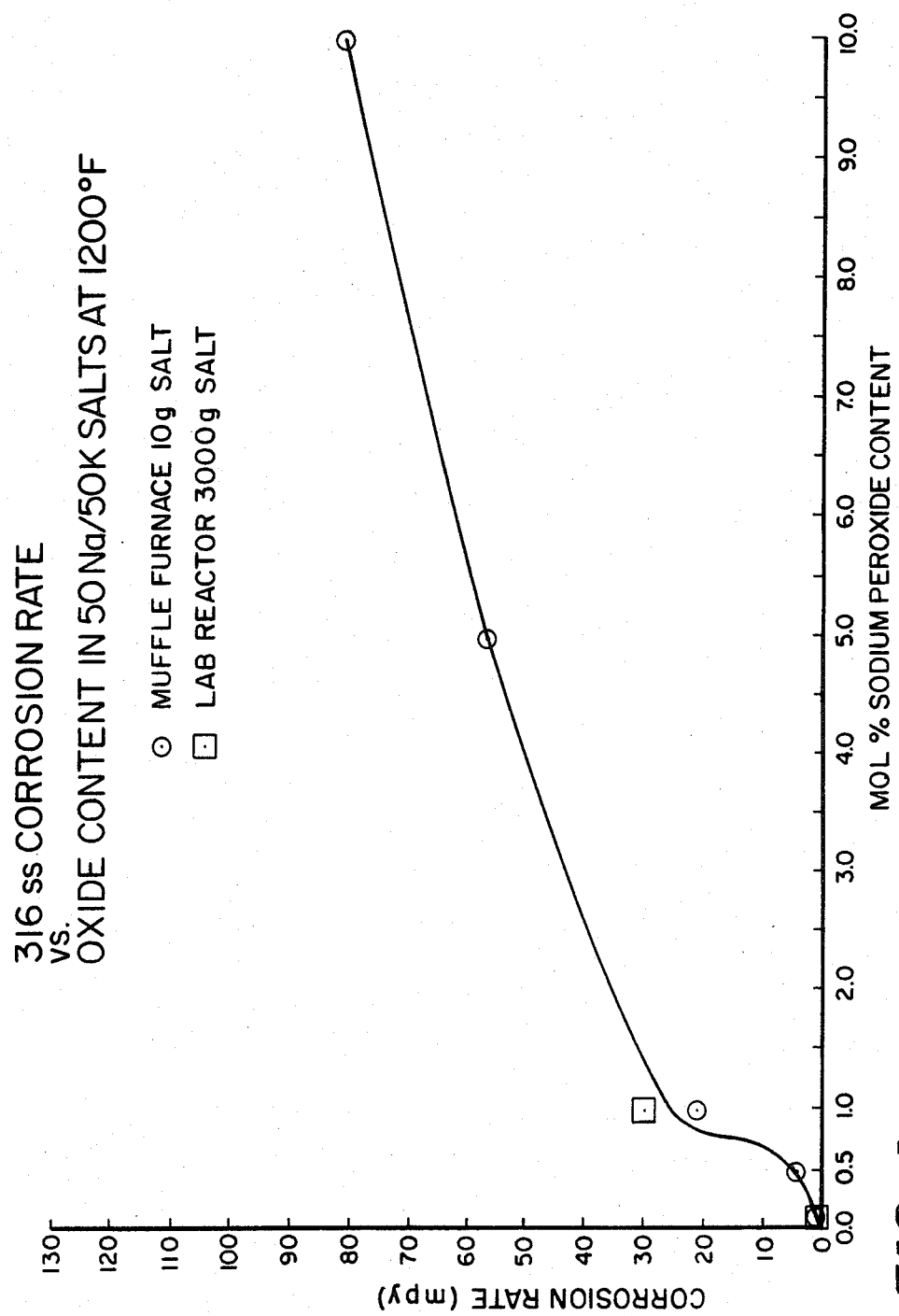
FIG. 1 is a graph of the corrosion rate at 316 stainless steel versus the oxide content of a molten nitrate nitrite salt solution showing a marked corrosion rate difference at a break point of approximately 1 mole % sodium peroxide content.

The present invention identifies an air separation technique for preferably recovering oxygen or alternately nitrogen from air by the use of a reversible chemical reaction between an oxygen acceptor and a feed air stream. Various oxygen accepting compounds are known in the prior art as set forth in the preceding text. Specifically, a relevant system is set forth in U.S. Pat. Nos. 4,132,766, 4,287,170 and 4,340,578 which are hereby incorporated by reference. Such a system includes a molten mixture of alkali metal salts which constitute the oxygen acceptor. The salt anion composition includes 50 to 90% nitrate, 4 to 25% nitrite, and combined peroxides, oxides and superoxides. The cation composition includes sodium and potassium in any proportions, preferably between 30% and 70% sodium, the balance being potassium.

A preferred manner of operating such a chemical air separation with a molten salt solution involves the reaction between the salt and air in multiple countercurrent stages enabling the salt partial oxygen pressure to approach that of the incoming air and greatly exceeding that of the exhaust air. If nitrogen is not going to be recovered, the exhaust air from the oxygen absorption can be combusted with fuel and expanded to recover power for compression of the feed air to the process. And finally it is beneficial to heat exchange the absorption reaction and decomposition reaction for greater thermodynamic efficiencies.

More generally, the oxygen acceptor comprised of molten alkali nitrates and nitrites is contacted with a free oxygen-containing gas mixture, such as air, under conditions such that it undergoes reaction with part of the free oxygen, yielding a condensed phase oxidized oxygen acceptor. The condensed phase material is readily separated from the exhausting nitrogen-rich gas and is then caused to release its oxygen in relatively pure form by a decomposition reaction, the decomposition reaction is caused to occur by reducing the pressure and/or supplying heat and may be aided by also supplying a stripping gas. Upon decomposition, the oxidized oxygen acceptor reverts to oxygen acceptor and the evolved gas, enriched in oxygen content, is collected. The cycle may be performed in a continuous or stage basis.

This process is carried out by introducing air into a compressor to compress it to elevated pressure wherein it is then passed to an oxidation reactor so as to contact and react with molten oxygen acceptor composition contained therein. The exhaust oxygen depleted air is then expanded through a turbo expander thereby recovering its compression energy and mechanical energy developed by the turbo expander and can advantageously be used to supply motor power to the compressor, for example by direct mechanical coupling. The exhaust from the turbo expander which normally will be quite hot and can contain residual oxygen can optionally be used to support combustion of a process heater. Molten salt circulates from the oxidation reactor in a closed loop to a decomposition reactor. The decomposition reactor preferably should be in heat exchange contact with the acceptor. The decomposing oxidized oxygen acceptor comprises a two phase stream having oxygen gas and regenerating oxygen acceptor. This is introduced into a separator vessel wherein the oxygen gas can be removed and separated from the molten salt solution. The regenerated molten salt is then returned to the oxidation reactor for reuse, preferably in a continuous manner.

Previous disclosures in this field have indicated that oxide contents in the molten salt solution may variously be above 1% or 2% in order to minimize corrosion, avoid nitrogen oxide formation in the process and to effectively catalyze the reversible reaction between the nitrate and nitrite species of the oxygen acceptor. It has been found by the present inventors that an unexpectedly desirable effect results by operating the air separation process wherein the oxide content of the molten salt solution containing oxygen acceptor is maintained below 1 mole % oxides based upon sodium peroxide. This is a decided departure from the teachings of the prior art which suggest that very low oxide levels are detrimental to the process and the process apparatus.

Specifically with regard to FIG. 1 of the present invention, a graph of the corrosion rate of process equipment versus the oxide content of the molten salt is shown. Two sets of data are included in the graph, one involving a muffle furnace having 10 g molten salt solution capacity and a second being a lab reactor having 3000 g of molten salt capacity. The corrosion evaluation was performed on 316 stainless steel. The molten salt solution contained a 50-50 mix of sodium and potassium cation salts with an anion composition of nitrate and nitrite heated to 1200° F. As can be seen on the graph, unexpectedly low corrosion rates are achieved with sodium peroxide contents of less than 1 mole%. The curve between 0 and 1 mole % is concave upward and achieves a point of inflection at approximately 1 mole %. The remaining curve above 1 mole % shows a smooth generally concave downward sloping line which would provide no indication of the unexpected low corrosion rate for the low oxide levels of the present invention. All of the prior art regarding oxide levels would only given indications of the curve above the 1 mole % level based on sodium peroxide. An extrapolation of such previous data would not have disclosed the unexpected sharp break-off in corrosion rate that has been demonstrated to result from the data produced and reported by the present inventors. Therefore, the present invention utilizing a molten salt solution for chemical air separation wherein the oxide level on a sodium peroxide basis is maintained below 1% provides an unexpectedly low corrosion rate for the system utilized in a typical steel apparatus. The prior art expected that corrosion rates would remain high for such low oxide levels.

Figure 2:
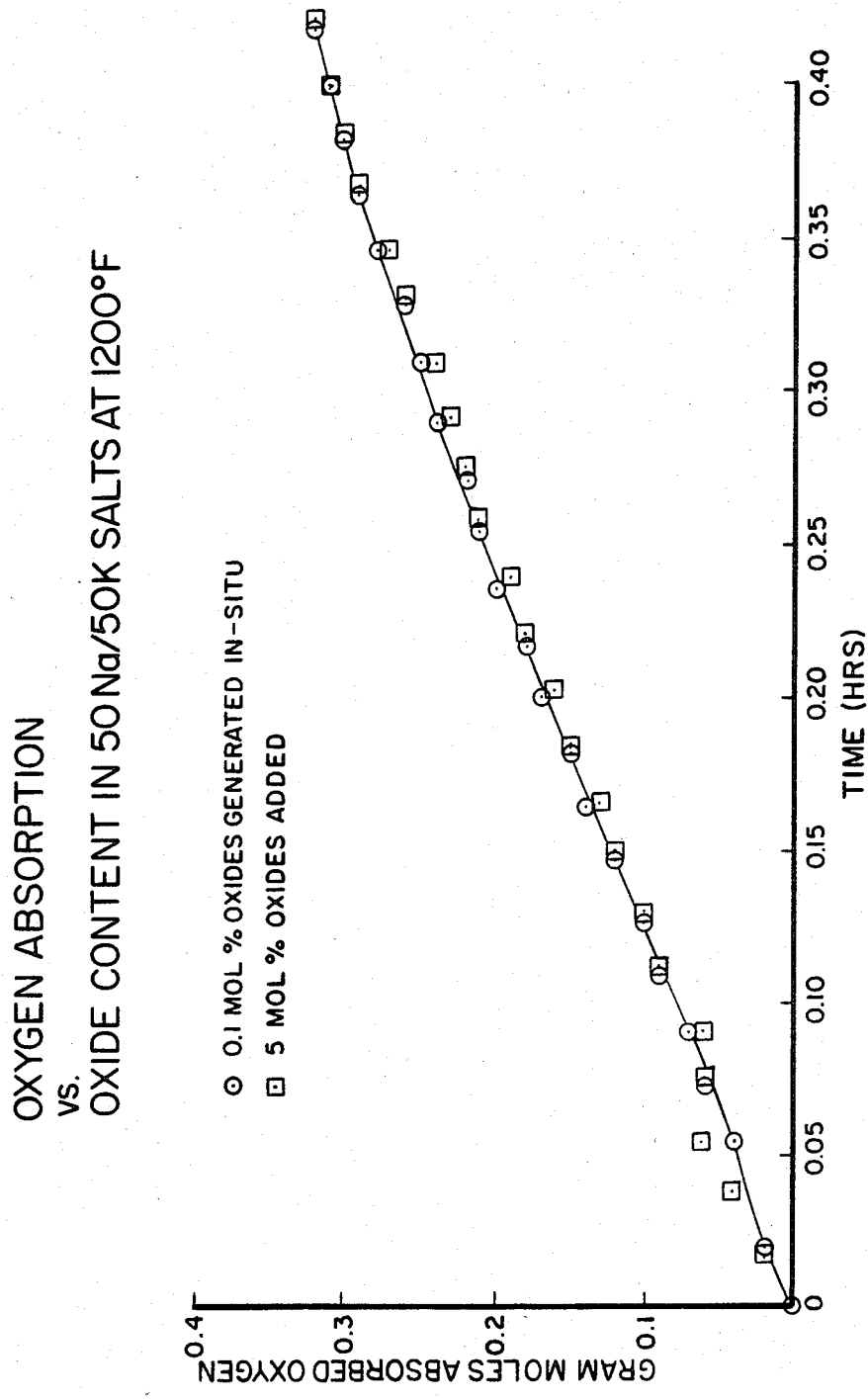
FIG. 2 is a graph of absorbed oxygen versus time for a low oxide salt solution and a high oxide salt solution showing similar oxygen absorption capability.

The prior art also taught that a significant oxide level was necessary in order to catalyze the reversible oxygen uptake reaction of the nitrate-nitrite system. The present inventors have found, contrary to the teaching of the prior art, that even the low oxide levels which they have discovered to be utilizable in the chemical air separation technique have similar oxygen uptake capabilities to the high oxide levels of the prior art. In FIG. 2, a graph of gram moles of absorbed oxygen versus time in hours is set forth. Two sets of data are provided wherein the circle data shows a molten salt solution having 0.1 mole % oxides generated in situ and the square data points show a 5 mole % oxide added to the molten salt solution. Contrary to the teachings of the prior art, the two sets of data show correspondingly similar linear progressions for oxygen uptake with the progression of time of contact. This discovery on the part of the inventors negates the teachings of the prior art that extremely low oxide levels would not effectively catalyze the chemical air separation. The inventors have now confirmed unexpectedly that the very low oxide levels, specifically below 1 mole % based on sodium peroxide, have just as effective catalytic effect on the molten salt systems as higher oxide levels. Specifically, the 0.1 mole % oxide level shown in FIG. 2 is a species of the range claimed in the present invention, whereas the 5 mole % oxide data in FIG. 2 represents a species from the oxide range set forth in the prior art.

Figure 3:
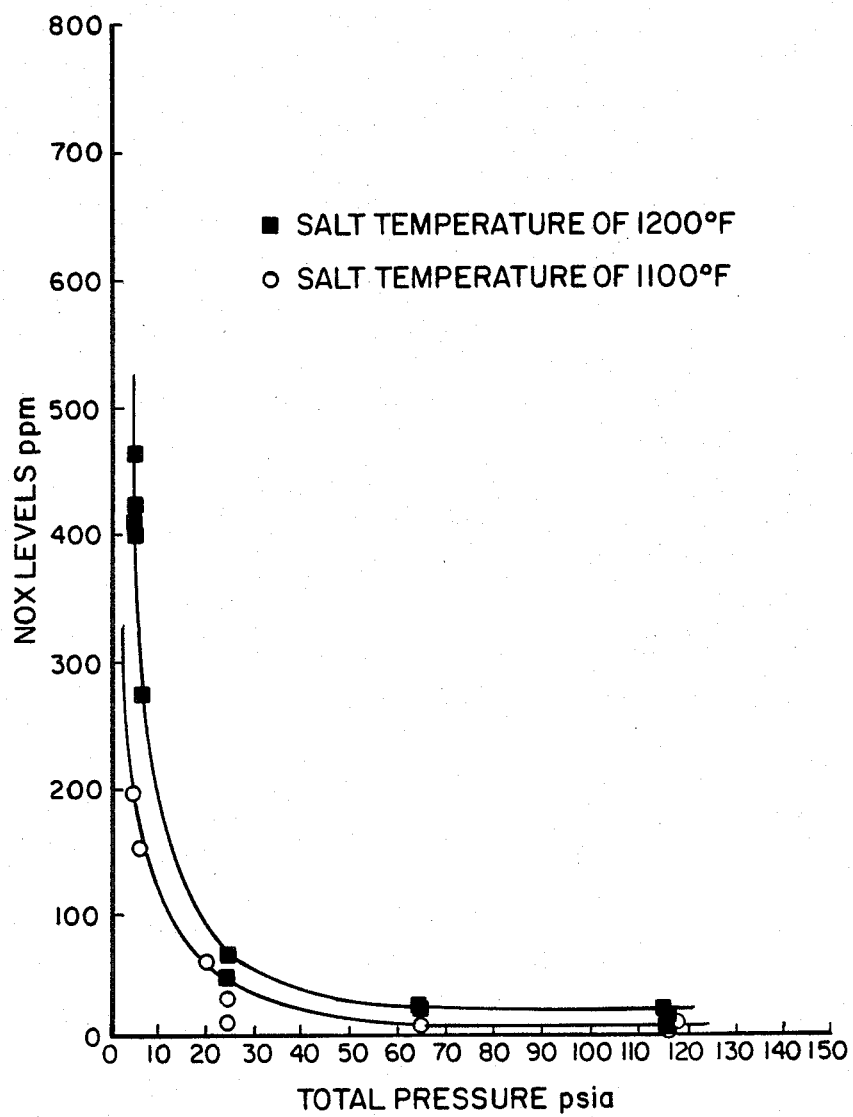
FIG. 3 is a graph of the NOX levels produced in the process of the invention versus pressure for different temperature salt solutions having 0.1 to 0.3 mole % oxides generated in situ.
Figure 4:
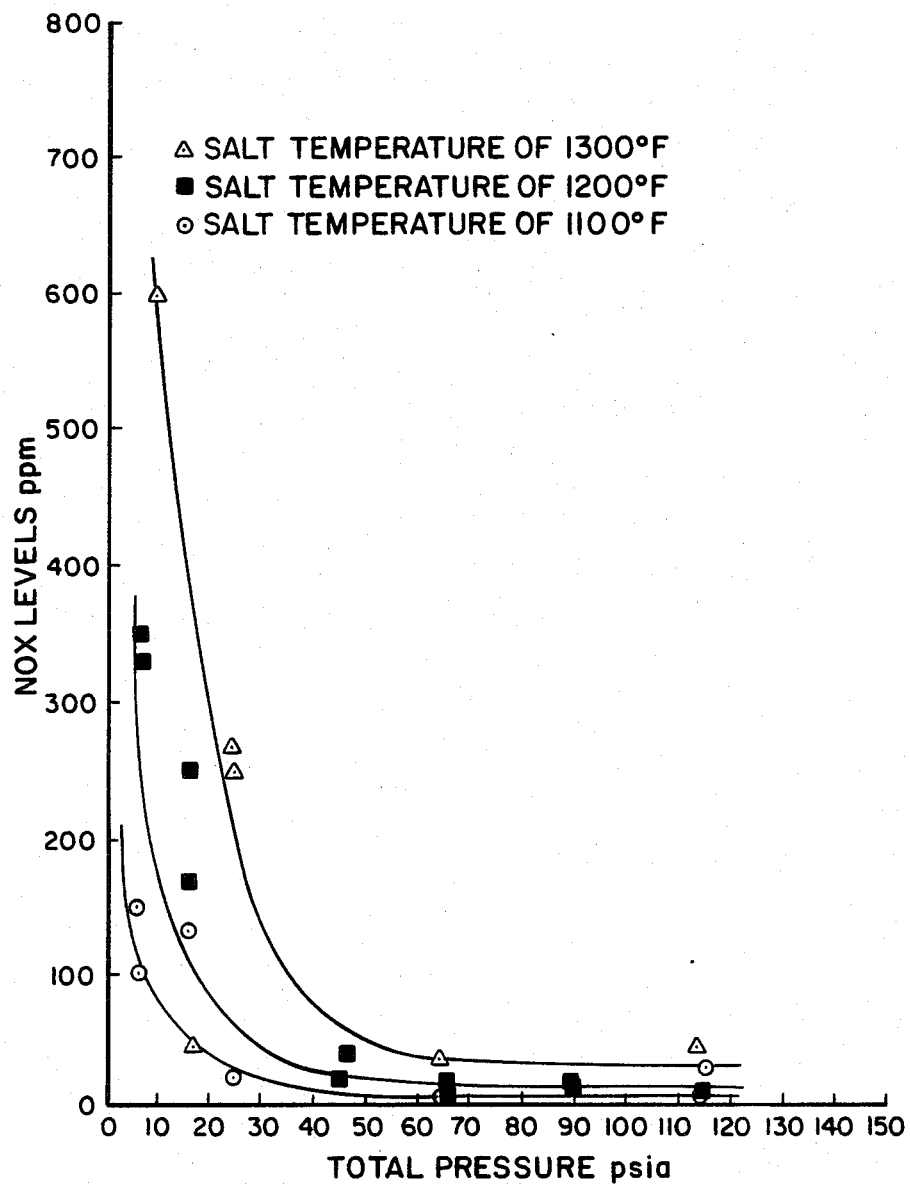
FIG. 4 constitutes a graph of NOX levels versus total pressure for a series of different salt temperatures, said salt having an oxide content of 1.52 mole %.

The prior art had also indicated that the absence of oxides or low oxides would effect high NOX production levels. The inventors have found that NOX levels are low for low oxide containing molten salt mixtures in the chemical air separation technique of the present invention, as set forth in FIG. 3 and FIG. 4. In FIG. 3, several runs of a salt mixture with 0.1 to 0.3 mole % oxides are set forth at temperatures of 1100° and 1200° F. In FIG. 4, three runs of a salt mixture with 1.52 mole % oxides are set forth at temperature levels of 1100°, 1200° and 1300° F. As can be seen from the data in the curves, NOX levels can be maintained at acceptably low ranges when adequate total pressures are utilized in the system. These NOX levels are similar to those achieved when the high oxide contents of the prior art were utilized.

As a result of this data, it is shown, contrary to the prior art, that very low oxide levels of less than 1 mole % based on sodium peroxide provide just as good catalytic effect to the chemical air separation process, while actually effecting an improved low corrosion rate and maintaining a low nitrogen oxide by-product formation rate. This unexpected combination of attributes could not have been ascertained from the disclosures of the prior art and constitutes the significant inventive effort of the present inventors. The graph set forth in FIG. 1 was derived from data experimentally derived and reported in Table 1 below.

TABLE 1

| Mol % of sodium peroxide | Corrosion rate, mpy |
|---|---|
| 0.1 | 0.2–0.5 |
| 0.5 | 0.4 |
| 1.0 | 21–30 |
| 5.0 | 57 |
| 10.0 | 82 |

Based on the corrosion rates that were known in the prior art, one would expect that corrosion rates for 0 to 1 mole % oxide content of the present invention to be in the range of 15 to 20 mpy (mils per year). However, as can be seen from the data, the corrosion rates were decidedly lower. These corrosion rates were measured by exposing 316 stainless steel coupons to salt mixtures of varying oxide contents as set forth above over a period of about 2 weeks.

The present invention has been set forth with reference to one embodiment of the technique of air separation by chemical reaction of an oxygen acceptor. It is contemplated that those skilled in the art will be aware of obvious variants which are deemed to be within the scope of the invention, which scope should be ascertained from the claims which follow.

We claim:

1. In a continuous process for recovering oxygen or nitrogen from air comprising reacting an oxygen acceptor with air in an absorption reaction to produce a nitrogen-rich effluent, separately decomposing the oxidized acceptor to yield oxygen and regenerated oxygen acceptor and recycling the oxygen acceptor, said oxygen acceptor comprising a molten solution of alkali metal salt of a cation composition of sodium and potassium cations and an anion composition of 50 to 94% nitrate, 4 to 25% nitrite and combined peroxide, oxide and superoxide, the improvement wherein said oxides are present in less than 1 mol% based on sodium peroxide.

2. The process of claim 1 wherein the reaction temperature is in the range of 850° to 1250° F.

3. The process of claim 1 wherein the oxides are added to the molten solution.

4. The process of claim 1 wherein the oxides are formed in-situ in the molten solution by first pretreating the molten solution at high temperature.

5. The process of claim 1 wherein the reaction temperature is approximately 1200° F.

6. The process of claim 1 wherein the oxide concentration is approximately 0.1 mol%.

* * * * *